(12) United States Patent
Tian

(10) Patent No.: US 9,001,739 B2
(45) Date of Patent: Apr. 7, 2015

(54) EVOLVED UNIVERSAL MOBILE TELECOMMUNICATION RADIO ACCESS NETWORK SYSTEM AND TASK TRACKING METHOD THEREOF

(75) Inventor: Wei Tian, Shenzhen (CN)

(73) Assignee: ZTE Corporation (CN)

( * ) Notice: Subject to any disclaimer, the term of this patent is extended or adjusted under 35 U.S.C. 154(b) by 172 days.

(21) Appl. No.: 13/807,585

(22) PCT Filed: Dec. 21, 2010

(86) PCT No.: PCT/CN2010/080076
§ 371 (c)(1),
(2), (4) Date: Dec. 28, 2012

(87) PCT Pub. No.: WO2012/003701
PCT Pub. Date: Jan. 12, 2012

(65) Prior Publication Data
US 2013/0100892 A1 Apr. 25, 2013

(30) Foreign Application Priority Data
Jul. 9, 2010 (CN) .......................... 2010 1 0225129

(51) Int. Cl.
*H04W 4/00* (2009.01)
*H04W 40/00* (2009.01)
(Continued)

(52) U.S. Cl.
CPC .............. *H04W 40/00* (2013.01); *H04W 24/00* (2013.01); *H04W 28/18* (2013.01); *H04W 48/08* (2013.01); *H04W 74/00* (2013.01)

(58) Field of Classification Search
CPC . H04W 4/22; H04W 76/007; H04W 36/0072; H04W 40/36; H04W 64/00; H04W 76/002; H04J 11/0069

USPC ......... 370/328, 329; 455/404.2, 435.1, 456.1, 455/456.2
See application file for complete search history.

(56) References Cited

U.S. PATENT DOCUMENTS

2007/0178911 A1* 8/2007 Baumeister et al. ........ 455/456.1
2009/0312001 A1* 12/2009 Bodog .......................... 455/418
(Continued)

FOREIGN PATENT DOCUMENTS

CN          1929666       3/2007
CN          101018194     8/2007
(Continued)

OTHER PUBLICATIONS

International Search Report for International Patent Application No. PCT/CN2010/080076, mailed Apr. 14, 2011.

*Primary Examiner* — Dang Ton
*Assistant Examiner* — Sai Aung
(74) *Attorney, Agent, or Firm* — McAndrews, Held & Malloy, Ltd.

(57) ABSTRACT

The disclosure claims an Evolved Universal Mobile Telecommunication System (UMTS) Radio Access Network (E-UTRAN) system and a task tracking method thereof. The method comprises the steps of: creating a message, which carries the parameters of multiple tasks for tracking a same user; sending the message to an Evolved NodeB (eNodeB), which is used for the eNodeB to create multiple tasks to track the user according to the parameters. The disclosure also claims an E-UTRAN system, which comprises: a creation module, configured to create a message which carries the parameters of multiple tasks for tracking a same user; a sending module, configured to send the message to the eNodeB; an eNodeB, configured to establish multiple tasks to track the user according to the parameters. The disclosure can guarantee that multiple tasks track one appointed user synchronously.

4 Claims, 1 Drawing Sheet

(51) Int. Cl.
*H04W 24/00* (2009.01)
*H04W 28/18* (2009.01)
*H04W 48/08* (2009.01)
*H04W 74/00* (2009.01)

(56) References Cited

U.S. PATENT DOCUMENTS

| | | | |
|---|---|---|---|
| 2010/0029298 A1* | 2/2010 | Iwamura et al. | 455/456.1 |
| 2010/0093372 A1* | 4/2010 | Timiri et al. | 455/456.2 |
| 2010/0128646 A1* | 5/2010 | Gao | 370/312 |
| 2010/0220680 A1* | 9/2010 | Ramankutty et al. | 370/329 |
| 2010/0291894 A1* | 11/2010 | Pipes | 455/404.2 |
| 2010/0297979 A1* | 11/2010 | Watfa et al. | 455/404.1 |
| 2010/0297998 A1* | 11/2010 | Hapsari et al. | 455/438 |
| 2011/0158165 A1* | 6/2011 | Dwyer et al. | 370/328 |
| 2011/0269460 A1* | 11/2011 | Dalsgaard et al. | 455/435.1 |
| 2011/0300886 A1* | 12/2011 | Hapsari et al. | 455/500 |

FOREIGN PATENT DOCUMENTS

| | | | | |
|---|---|---|---|---|
| CN | 101018194 A | * | 8/2007 | 370/328 |
| CN | 101242612 A | * | 8/2008 | 370/328 |

* cited by examiner

EVOLVED UNIVERSAL MOBILE TELECOMMUNICATION RADIO ACCESS NETWORK SYSTEM AND TASK TRACKING METHOD THEREOF

FIELD OF THE INVENTION

The disclosure relates to the field of communication, and in particular to an Evolved Universal Mobile Telecommunication System (UMTS) Radio Access Network (E-UTRAN) system and a task tracking method thereof.

BACKGROUND OF THE INVENTION

As the complexity of the mobile communication network service and technology is continuously increased, and the market competition is rapidly intensified, the network maintenance gradually changes from aiming at the network equipment to aiming at service and focusing on the customer perception. The tracking function is a key technology to adapt for the management request in the view of the commercial network application technology.

The tracking tool in the mobile communication network is an assistant tool of a network management system, which plays a very important role in failure locating and daily operation and maintenance. The tracking tool has the functions of recording on spot and locating problems. Thereby, maintainers can conveniently observe the real-time calling process, and the foreground developers can conveniently locate the failures and debug the foreground programs.

The Long Term Evolution (LTE) system gives relative description of the tracking process in 36.413 and 36.423. The tracking interaction process between a Mobile Management Entity (MME) and an Evolved NodeB (eNodeB) is described in an S1 Application Protocol (S1 AP). The tracking interaction process when switching occurs among the eNodeBs is descried in an X2 Application Protocol (X2 AP).

In the above, a tracking task is sent via a trace activation information element (IE) between the network elements. The trace activation IE is described in the protocol as follows:

In the above, the E-UTRAN Trace ID represents a tracking task number; the E-UTRAN Trace ID has totally 8 bytes, which is equal to 6 bytes of Trace Reference plus 2 bytes of Trace Recording Session Reference. In the above, the Trace Reference is the trace reference number, and the Trace Recording Session Reference represents the reference number of different callings under one tracking task.

But the inventor finds that it can be seen from structure of the trace activation that the current message which contains the trace activation IE can only carry one tracking task. Hence, the current protocol cannot support that two or more tracking tasks need to track one user synchronously, and synchronously tracking one appointed user by multiple tasks cannot be realized. However, the condition that multiple tasks synchronously track one appointed user commonly exists, for example, synchronously opening two or more tracking tools to synchronously track one appointed user, and the like. Meanwhile, there is another problem that when the user implements X2 switching, multiple tracking tasks cannot be carried to the target cell due to the limit of trace activation. Then, the target cell cannot create the tracking task, and trace abnormality is caused.

SUMMARY OF THE INVENTION

The disclosure provides an E-UTRAN system and a task tracking method thereof, in order to at least solve the problem that the conventional art cannot realize synchronously tracking one appointed user by multiple tasks.

According to one aspect, the disclosure provides a task tracking method of an E-UTRAN system, comprising: creating a message, wherein the message carries parameters of multiple tasks for tracking a same user; and sending the message to an Evolved NodeB (eNodeB), which is used for the eNodeB to create the multiple tasks to track the user according to the parameters.

According to another aspect, the disclosure provides an E-UTRAN system, comprising: a creation module, config-

TABLE 1

| IE/Group Name | Presence | Range | IE type and reference | Semantics description |
|---|---|---|---|---|
| E-UTRAN Trace ID | M | | OCTET STRING (8) | The E-UTRAN Trace ID IE is composed of the following: Trace Reference defined in [10] (leftmost 6 bits of OCTETS), and Trace Recording Session Reference defined in [10] (last 2 bits of OCTETS) |
| Interfaces To Trace | M | | BIT STRING (8) | Each position in the bitmap represents a eNB interface; first bit = S1-MME, second bit = X2, third bit = Uu; other bits reserved for future use. Value '1' indicates 'should be traced'. Value '0' indicates 'should not be trace'. |
| Trace depth | M | | ENUMERATED( minimum, medium, maximum, MinimumWithoutVendorSpecific Extension, MediumWithoutVendorSpecificE xtension, MaximumWithoutVendorSpecific Extension, . . . ) | Defined in [10] |
| Trace Collection Entity IP Address | M | | Transport Layer Address 9.2.2.1 | Defined in [10] | ured to create a message, wherein the message carries parameters of multiple tasks for tracking a same user; a sending module, configured to send the message to an Evolved NodeB (eNodeB); and the eNodeB, configured to create the multiple tasks to track the user according to the parameters.

The E-UTRAN system of the disclosure and the task tracking method thereof can carry the parameters of multiple tasks for tracking a same user in one message. Thus, the solution can solve the problem that the conventional art cannot realize synchronously tracking one appointed user by multiple tasks, and can guarantee that multiple tasks synchronously track one appointed user.

BRIEF DESCRIPTION OF THE DRAWINGS

The drawings described herein are used for further understanding of the disclosure, and forms a part of the application. The schematic embodiments and the descriptions are used for explaining the disclosure, without improperly limiting the disclosure. In the drawings.

DETAILED DESCRIPTION OF THE EMBODIMENTS

The disclosure is described below in detail with reference to the drawings and the embodiments. It should be noted that the embodiments of the application and the features of the embodiments can be combined with each other under the condition of no conflict.

The tracking tool in the mobile communication network is an assistant tool of the network management system. The tracking tool plays a very important role in failure location and daily operation and maintenance, and has the functions of recording on spot and locating problems. Thereby, maintainers can conveniently observe the real-time calling process, and the foreground developers can conveniently locate the failures and debug the foreground programs.

Figure 1:
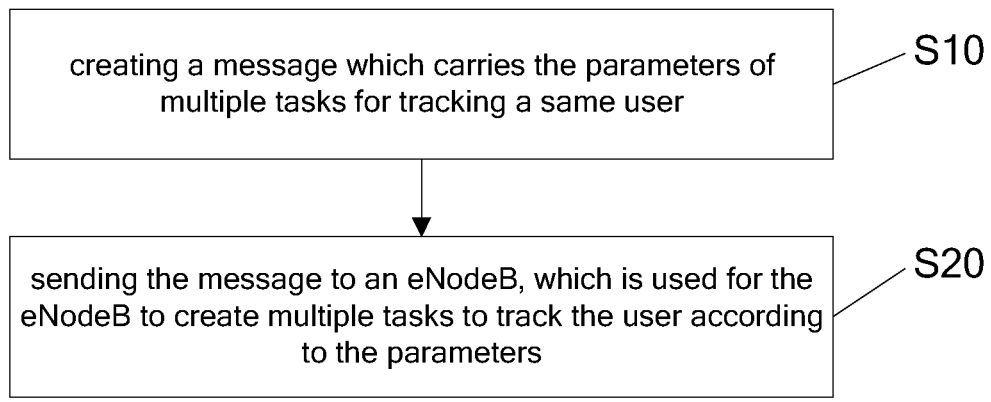
FIG. 1 shows a flowchart of a task tracking method of an E-UTRAN system according to an embodiment of the disclosure.

FIG. 1 shows a flowchart of a task tracking method of an E-UTRAN system according to an embodiment of the disclosure, comprising the following steps:

Step S10, creating a message, which carries the parameters of multiple tasks for tracking a same user; and Step S20, sending the message to an eNodeB, which is used for the eNodeB to create multiple tasks to track the user according to the parameters.

In the conventional art, the message containing the trace activation IE can only carry one tracking task. Hence, the current protocol cannot support that two or more tracking tasks need to track one user synchronously. However, the task tracking method of the embodiment carries the parameters of multiple tasks for tracking a same user in one message. The problem that the conventional art cannot realize synchronously tracking one appointed user by the multiple tasks can be solved, and further, synchronously tracking one appointed user by the multiple tasks can be guaranteed.

Preferably, Step S10 comprises the steps of: setting a trace activation list IE in the message, comprising: a trace activation IE number field configured to indicate a number N of the trace activation IEs, wherein each of the trace activation IEs is configured to carry the parameters of one task of the multiple tasks; and adding a new trace activation list IE, wherein the trace activation list IE comprises the number of the trace activation IEs and the multiple specific trace activation IEs, as shown in the following table:

TABLE 2

| Field | Description |
| --- | --- |
| trace activation number | trace activation number |
| Trace activation | Task tracking IE |

The trace activation list IE has simple structure, and is easy to be implemented.

Preferably, the process that the eNodeB decodes the trace activation list IE to create the tasks comprises the steps that: the eNodeB receives the message; the eNodeB decodes the message to acquire the trace activation IE number field, and to determine the number of multiple trace activation IEs according to the trace activation IE number field; the eNodeB decodes the message to acquire the multiple trace activation IEs, the number of which is the number; the eNodeB creates multiple tasks according to the parameters of the multiple trace activation IEs respectively; and the eNodeB executes multiple tasks to track the user. The embodiment can be easily implemented due to little modification to the conventional eNodeB. In the case that multiple tracking tasks synchronously track one appointed user, the embodiment can synchronously process the multiple signaling tracking tasks via the related message interaction process of the LTE.

For example, when multiple tracking tasks for tracking the same appointed user is started, the MME carries the trace activation list IE via the first downlink message of the S1 interface, and brings the parameters of the multiple tracking tasks to the eNodeB. When decoding the message, the eNodeB decodes the corresponding trace activation IE according to the trace activation number carried in the trace activation list IE, and creates the corresponding tracking tasks for tracking.

Preferably, the Step S10 comprises the step of: setting multiple trace activation IEs in the message, and each trace activation IE comprises: the parameters of one task of the multiple tasks; and an IsLastRecord (whether it is the last tracking IE) field is configured in the trace activation IE to indicate whether the trace activation IE carrying the IsLastRecord field is the last trace activation IE of the message. The embodiment adds a field on the end of the trace activation IE to indicate whether other trace activation IE exists behind the current trace activation IE, as shown in the following table:

TABLE 3

| Field | Description |
| --- | --- |
| E-UTRAN Trace ID | Existing field |
| Interfaces To Trace | Existing field |
| Trace depth | Existing field |
| Trace Collection Entity IP Address | Existing field |
| IsLastRecord | Whether it is the last tracking IE |

The trace activation IE has simple structure, and is easy to be implemented.

Preferably, the process that the eNodeB uses the trace activation IE to decode and create the tasks comprises the steps that: the eNodeB receives the message; the eNodeB decodes the message to acquire the multiple trace activation IEs, comprising: when decoding the message to acquire the current trace activation IE, the eNodeB judging whether the current trace activation IE is the last trace activation IE in the message according to the IsLastRecord field in the current trace activation IE; and if the current trace activation IE is not the last trace activation IE, continuing decoding the message to acquire a next trace activation IE, and continuing judging whether the next trace activation IE is the last trace activation IE, until the last trace activation IE is acquired by decoding the message; the eNodeB creates the multiple tasks according to the parameters of the multiple trace activation IEs respectively; and the eNodeB executes the multiple tasks to track the user. The embodiment can be simply implemented due to little modification to the conventional eNodeB. In the case that multiple tracking tasks synchronously track one appointed user, the embodiment can synchronously process the multiple signaling tracking tasks via the related message interaction process of the LTE.

Preferably, the MME sends the message as a first downlink message of an S1 interface to the eNodeB; or, the MME sends the message as a switching message to the eNodeB when switching occurs among the eNodeBs.

For example, after multiple tracking tasks for tracking the same appointed user are started, the MME carries a new trace activation IE via the first downlink message of the S1 interface, and brings the parameters of the multiple tracking tasks to the eNodeB. The new trace activation IE comprises the fields of the trace activation IE of the current protocol and the flag IsLastRecord which indicates whether the current tracking task is the last tracking task.

Alternatively, eNodeB_A sends the switching message to the MME when switching occurs among eNodeBs based on S1. The MME sends the switching message to eNodeB_B. The switching request message which is sent to the eNodeB_B by the MME carries the trace activation IE.

When switching occurs among eNodeBs based on X2, eNodeB_A directly sends the switching message to eNodeB_B, and carries the trace activation IE. After decoding the message, the eNodeB judges whether the current tracking task is the last task according to the IsLastRecord field. If there is a tracking task behind the current tracking task, the eNodeB continues decoding; otherwise, the decoding process of this part is ended. Finally, the eNodeB creates the corresponding tasks according to the decoding result, and reports the tracking results respectively.

Figure 2:
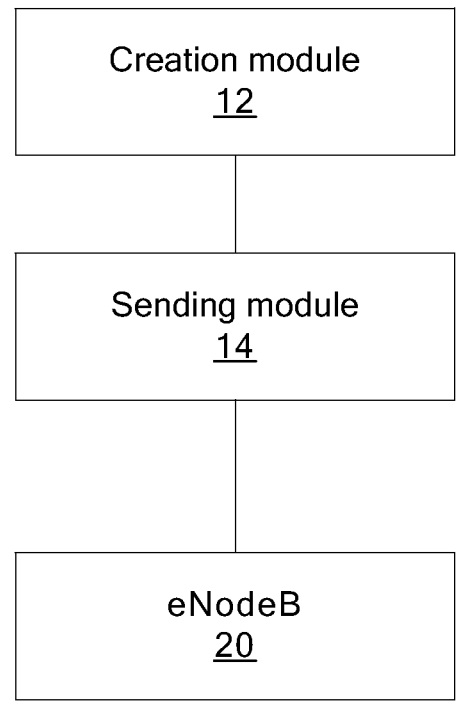
FIG. 2 shows a block diagram of an E-UTRAN system according to an embodiment of the disclosure.

FIG. 2 shows a block diagram of an E-UTRAN system according to an embodiment of the disclosure, comprising:

a creation module 12, configured to create a message which carries the parameters of the multiple tasks for tracking a same user;

a sending module 14, configured to send the message to the eNodeB 20; and the eNodeB 20, configured to create multiple tasks to track a user according to the parameters.

The E-UTRAN system of the embodiment carries the parameters of multiple tasks for tracking a same user in one message. Thus, this solution can solve the problem that the conventional art cannot realize synchronously tracking one appointed user by multiple tasks, and guarantee that multiple tasks synchronously track one appointed user.

Preferably, the creation module is configured to set the trace activation list IE in the message, wherein the trace activation list IE comprises: a trace activation IE number field, configured to indicate a number; and each trace activation IE of multiple trace activation IEs, number of which is the number, is configured to carry the parameters of one task of the multiple tasks. The embodiment is easy to be implemented.

Preferably, the eNodeB comprises: a receiving module, configured to receive the message; a first decoding module, configured to decode the message to acquire the trace activation IE number field, and to determine the number of the multiple trace activation IEs according to the trace activation IE number field; a second decoding module, configured to decode the message to acquire the multiple trace activation IEs, number of which is the number; a task creation module, configured to create multiple tasks according to the parameters of the multiple trace activation IEs respectively; and an execution module, configured to execute the multiple tasks to track the user. This embodiment is easy to be implemented.

Preferably, the creation module is configured to set multiple trace activation IEs in the message, wherein each trace activation IE comprises: the parameters of one task of the multiple tasks; and an IsLastRecord field is configured to indicate whether the trace activation IE carrying the IsLastRecord field is the last trace activation IE in the message. This embodiment is easy to be implemented.

Preferably, the eNodeB comprises: a receiving module, configured to receive the message; a decoding module, configured to decode the message to acquire the multiple trace activation IEs, and to determine whether the current trace activation IE is the last trace activation IE of the message according to the IsLastRecord field in the current trace activation IE when decoding the message to acquire the current trace activation IE; and if the current trace activation IE is not the last trace activation IE, to continue decoding the message to acquire a next trace activation IE, and to continue judging whether the next trace activation IE is the last trace activation IE, until the last trace activation IE is acquired by decoding the message; a task creation module, configured to create multiple tasks according to the parameters of the multiple trace activation IEs respectively; and an execution module, configured to execute the multiple tasks to track the user. This embodiment can be easily realized.

Preferably, the creation module and the sending module can be located on one MME. The MME takes the message as a first downlink message of the S1 interface to send to the eNodeB. Or, the creation module and the sending module can be located on another eNodeB. The another eNodeB sends the message to the eNodeB via an X2 interface when switching occurs among eNodeBs. This embodiment is easy to be implemented, and can be adapted for different occasions.

In view of the descriptions, the disclosure can send multiple tracking tasks to an instance process of the user in one S1 message when multiple tasks synchronously track one appointed user. Meanwhile, in the X2 switching process, the instance process of the user in a source cell can carry the multiple tracking tasks to a target cell in a switching request message, so as to make the target cell correctly create the corresponding tracking tasks.

Obviously, those skilled in the art should understand that each of the mentioned modules or steps of the disclosure can be realized by universal computing devices; the modules or steps can be focused on single computing device, or distributed on the network formed by multiple computing devices; selectively, they can be realized by the program codes which can be executed by the computing device; thereby, the modules or steps can be stored in the storage device and executed by the computing device; and under some circumstances, the shown or described steps can be executed in different orders, or can be independently manufactured as each integrated circuit module, or multiple modules or steps thereof can be manufactured to be single integrated circuit module, thus to be realized. The disclosure cannot be limited by any combination of the specific hardware and software.

The above is only the preferred embodiments of the disclosure and is not intended to limit disclosure. For those skilled in the art, the disclosure may have various changes and modifications. Any modifications, equivalent replacements, improvements and the like within the spirit and principle of the disclosure shall fall within the scope of protection of the disclosure.

What is claimed is:

1. A task tracking method of an Evolved Universal Mobile Telecommunication System (UMTS) Radio Access Network (E-UTRAN) system, comprising:

creating a message, wherein the message carries parameters of multiple tasks for tracking a same user; and sending the message to an Evolved NodeB (eNodeB), which is used for the eNodeB to create the multiple tasks to track the user according to the parameters;

wherein carrying the parameters of the multiple tasks for tracking the same user in the message comprises: setting multiple trace activation IEs in the message; each trace activation IE comprises: parameters of one task of the multiple tasks; and an IsLastRecord field is configured to indicate whether an trace activation IE carrying the IsLastRecord field is a last trace activation IE in the message;

wherein the method further comprises: the eNodeB receiving the message; the eNodeB decoding the message to acquire the multiple trace activation IEs, comprising: when decoding the message to acquire the current trace activation IE, the eNodeB judging whether a current trace activation IE is the last trace activation IE in the message according to the IsLastRecord field in the current trace activation IE; and if the current trace activation IE is not the last trace activation IE, continuing decoding the message to acquire a next trace activation IE, and continuing judging whether the next trace activation IE is the last trace activation IE, until the last trace activation IE is acquired by decoding the message; the eNodeB creating the multiple tasks according to parameters of the multiple trace activation IEs respectively; and the eNodeB executing the multiple tasks to track the user.

2. The method according to claim 1, wherein a Mobile Management Entity (MME) sends the message as a first downlink message of an S1 interface to the eNodeB; or, the MME sends the message as a switching message to the eNodeB when switching occurs among eNodeBs.

3. An Evolved Universal Mobile Telecommunication System (UMTS) Radio Access Network (E-UTRAN) system, comprising:

a first Evolved NodeB (eNodeB) or an Mobile Management Entity (MME) comprising a processor configured to execute program units stored on a memory, the program units comprising: a creation module, configured to create a message, wherein the message carries parameters of multiple tasks for tracking a same user; and a sending module, configured to send the message to a second Evolved NodeB (eNodeB); and the second eNodeB, configured to create the multiple tasks to track the user according to the parameters;

wherein the creation module is configured to set multiple trace activation IEs in the message; each trace activation IE comprises: parameters of one task of the multiple tasks; and an IsLastRecord field is configured to indicate whether an trace activation IE carrying the IsLastRecord field is a last trace activation IE in the message;

wherein the second eNodeB comprises: a receiving module, configured to receive the message; a decoding module, configured to decode the message to acquire the multiple trace activation IEs, and to determine whether a current trace activation IE is the last trace activation IE of the message according to the IsLastRecord field in the current trace activation IE when decoding the message to acquire the current trace activation IE; and if the current trace activation IE is not the last trace activation IE, to continue decoding the message to acquire a next trace activation IE, and to continue judging whether the next trace activation IE is the last trace activation IE, until the last trace activation IE is acquired by decoding the message; a task creation module, configured to create the multiple tasks according to parameters of the multiple trace activation IEs respectively; and an execution module, configured to execute the multiple tasks to track the user.

4. The system according to claim 3, wherein the creation module and the sending module are located on one Mobile Management Entity (MME), and the MME sends the message as a first downlink message of an S1 interface to the second eNodeB; or, the creation module and the sending module are located on the first eNodeB, and the another eNodeB sends the message to the eNodeB via an X2 interface when switching occurs among eNodeBs.

* * * * *